28-342 SR
2/30/86 XR RE 32,320

United States Patent [19]

Jacobson

[11] E Patent Number: Re. 32,320

[45] Reissued Date of Patent: Dec. 30, 1986

[54] $TiO_2$ PIGMENT BEARING A COATING WITH CERIUM CATIONS AND SULFATE-, PHOSPHATE- OR SILICATE ANIONS AND LAMINATE AND COATING CONTAINING SAME

[75] Inventor: Howard W. Jacobson, Wilmington, Del.

[73] Assignee: E. I. Du Pont de Nemours and Company, Wilmington, Del.

[21] Appl. No.: 737,501

[22] Filed: May 24, 1985

Related U.S. Patent Documents

Reissue of:

[64] Patent No.: 4,461,810
Issued: Jul. 24, 1984
Appl. No.: 481,925
Filed: Apr. 4, 1983

[51] Int. Cl.[4] ..... B32B 27/42; C09C 1/62; C09C 3/00

[52] U.S. Cl. ..... 428/530; 106/300; 106/308 B; 106/309; 428/328; 428/342; 524/493

[58] Field of Search ..... 106/308 B, 309, 300; 524/593; 428/328, 342, 530

[56] References Cited

U.S. PATENT DOCUMENTS

| | | | |
|---|---|---|---|
| 3,513,007 | 5/1970 | Lederer | 106/308 B |
| 3,767,455 | 10/1973 | Claridge et al. | 106/300 |
| 3,804,655 | 4/1974 | Hinley et al. | 106/308 B |
| 3,960,589 | 6/1976 | Morrison et al. | 106/296 |
| 4,239,548 | 12/1980 | Barnard et al. | 106/300 |

FOREIGN PATENT DOCUMENTS 1023590 3/1966 United Kingdom .

*Primary Examiner*—Herbert S. Cockeram

[57] ABSTRACT

A pigment of $TiO_2$ particles coated with alumina, whose particle surfaces have associated with them cerium cations and sulfate-, phosphate or silicate anions, can be used to prepare paper laminates having a high degree of lightfastness.

3 Claims, No Drawings

$TiO_2$ PIGMENT BEARING A COATING WITH CERIUM CATIONS AND SULFATE-, PHOSPHATE- OR SILICATE ANIONS AND LAMINATE AND COATING CONTAINING SAME

Matter enclosed in heavy brackets [ ] appears in the original patent but forms no part of this reissue specification; matter printed in italics indicates the additions made by reissue.

DESCRIPTION

Technical Field

This invention relates to pigment composed of coated $TiO_2$ particles. More particularly, it relates to a pigment of $TiO_2$ particles coated with alumina and having cerium cations and sulfate-, phosphate or silicate anions associated with them.

BACKGROUND AND SUMMARY OF THE INVENTION

Paper laminates are products widely used in the construction industry for making counter tops and the like. They are ordinarily composed of paper impregnated with $TiO_2$ pigment and imbedded in a polymer matrix. Such laminates have an unfortunate tendency to discolor on exposure to ultraviolet light, and this detracts from their value because in many uses they are necessarily exposed to such radiation.

The pigment of the present invention is highly resistant to discoloration on exposure to ultraviolet light, and, when used in making a paper laminate, gives a product with significantly better lightfastness than one made with conventional $TiO_2$ pigment.

The pigment of the invention is composed of rutile $TiO_2$ particles conventionally coated with alumina or with alumina-silica. The coating ordinarily constitutes 1-8%, by weight, of the pigment. Associated with the pigment particle surfaces are cerium cations (preferably $Ce^{+4}$ ions), at a concentration of [0.5-2%,] *about 0.17-2%*, by weight, and a stoichiometric amount of sulfate-, phosphate or silicate anions. "Associated with the particle surfaces" means that the ions are bound to the $TiO_2$ particles by a chemical or physical attraction.

The ion content of the pigment may be determined by ion plasma chromatography.

The amount of alumina the $TiO_2$ particles bear as coatings, expressed as percent by weight, is calculated by first determining, by ion plasma spectroscopy, (a) the alumina content of a pigment of the invention, and (b) the alumina content of the raw $TiO_2$ from which the pigment is made, and then computing the alumina coating content of the pigment by difference.

The cerium cations may be supplied by any water-soluble cerium salt, preferably cerium sulfate, and even more preferably ceric sulfate: when the anion is sulfate, this will also supply the sulfate ion. When the anion of choice is phosphate or silicate, it is supplied by using phosphoric acid or sodium silicate solution during preparation of the pigment, as will be described.

The $TiO_2$ used to prepare the pigment or the invention can be of the conventional rutile variety, prepared by either the chloride or the sulfate process.

The pigment of the invention can be made by first preparing an aqueous slurry containing 200-400 grams per liter of $TiO_2$. This slurry is brought to 45°-70° C.

and is held there during the rest of the preparation procedure. To the slurry is then added, with stirring, enough of a cerium salt to give a cerium ion concentration in the slurry of [0.5-2%,] *0.05-2%*, by weight of the $TiO_2$. If one desires a phosphate anion or a silicate anion to be associated with the pigment, he also adds a stoichiometric amount of phosphoric acid or sodium silicate. In any case, the slurry is then stirred for 1-15 minutes.

Alumina is then precipitated on the $TiO_2$ particles by slowly adding enough sodium aluminate to the slurry to give a concentration of about 2-8%, by weight of the $TiO_2$. Acid, ordinarily sulfuric or hydrochloric, is added at the same time to maintain the pH of the slurry within the range 6-9 during the precipitation step. After addition of the aluminate is complete, the slurry is allowed to cure, with stirring, for 15-30 minutes.

The resulting pigment is then separated from the liquid by filtration or centrifugation, is washed with water and then dried.

The pigment thus prepared may be used to prepare a paper laminate in any of the customary ways typically by mixing the pigment with paper pulp and then making paper of it in the usual way, impregnating this paper with resin, ordinarily a melamine-formaldehyde or urea-formaldehyde resin, and then curing the mixture with heat. These procedures are set forth in greater detail in U.S. Pat. No. 4,239,548, which is incorporated into this specification to show such procedures.

Coating compositions may be prepared with the pigments of the invention in any of the conventional ways, by blending the pigment with a film-forming component and a liquid carrier.

EXAMPLES

In the following examples, all parts are by weight.

EXAMPLE 1

Three thousand parts of rutile $TiO_2$ were dispersed in 7500 parts of distilled water, to give a slurry with a pH of 3.6. The slurry was then heated to and held at 50° C., and to it were added, over a 5-minute period, 145 parts of a solution of 85.5 parts of ceric sulfate in 1000 parts of water. The slurry at this point had a pH of 1.5. The slurry was then stirred for 10 minutes at 50° C.

To the slurry were then added, over a 30-minute period and with stirring at 50° C., 400 parts of an aqueous solution of sodium aluminate (containing an equivalent of 350 parts of $Al_2O_3$ per 1000 parts of water). During this addition, the pH of the slurry was held at about 6.5 by adding sulfuric acid.

When addition of the sodium aluminate was finished, the slurry was stirred for 30 minutes at 50° C. The $TiO_2$ was then filtered off, washed with water, dried and micronized.

The resulting pigment was composed of $TiO_2$ particles coated with alumina and having cerium and sulfate anions associated with them.

EXAMPLE 2

Three thousand parts of rutile $TiO_2$ were dispersed in 7500 parts of distilled water, to give a slurry with a pH of 3.6. The slurry was then heated to and held at 50° C., and to it were added, over a 5-minute period, 140 parts of a solution of 85.5 parts of ceric sulfate in 1000 parts of water.

When addition of the ceric sulfate was finished, 24 parts of concentrated $H_3PO_4$ were added and the slurry stirred for 10 minutes at 50° C.

To the slurry were then added, over a 30-minute period and with stirring at 50° C., 343 parts of an aqueous solution of sodium aluminate (containing an equivalent of 350 parts of $Al_2O_3$ per 100 parts of water). During this addition, the pH of the slurry was held at about 7.5 by adding sulfuric acid.

When the addition of the sodium aluminate was finished, the slurry was stirred for 30 minutes at 50° C. The $TiO_2$ was then filtered off, washed with water, dried and micronized.

The resulting pigment was composed of $TiO_2$ particles coated with alumina and having cerium cations and phosphate anions associated with them.

EXAMPLE 3

Two hundred parts of rutile $TiO_2$ were dispersed in 500 parts of distilled water, to give a slurry with a pH of 3.8. The slurry was then heated to and held at 50° C., and to it were added, over a 5-minute period, 9.4 parts of a solution of 85.5 parts of ceric sulfate in 1000 parts of water.

When the addition of the ceric sulfate was finished, 5 parts of an aqueous sodium silicate solution (containing an equivalent of 400 parts of $SiO_2$ per 1000 parts of water) were added and the slurry stirred for 10 minutes at 50° C.

To the slurry were then added, over a 10-minute period and with stirring at 50° C., 22.9 parts of an aqueous solution of sodium aluminate (containing an equivalent of 350 parts of $Al_2O_3$ per 100 parts of water). During this addition, the pH of the slurry was held at about 7.5 by adding sulfuric acid.

When the addition of the sodium aluminate was finished, the slurry was stirred for 30 minutes at 50° C. The $TiO_2$ was then filtered off, washed with water, dried and micronized.

The resulting pigment was composed of $TiO_2$ particles coated with alumina and having cerium cations and silicate anions associated with them.

I claim:

1. A pigment of rutile $TiO_2$ particles bearing coatings consisting of alumina or alumina-silica, the particle surfaces having associated therewith [0.5–2%,] *0.17–2%*, by weight of the $TiO_2$, of cerium cations and a stoichiometric amount of sulfate-, phosphate or silicate anions.

2. A paper laminate comprising paper and a pigment according to claim 1, in a rigid matrix.

3. A coating composition comprising (a) a pigment according to claim 1, (b) a film-forming material, and (c) a liquid carrier.

* * * * *